Figure 1:
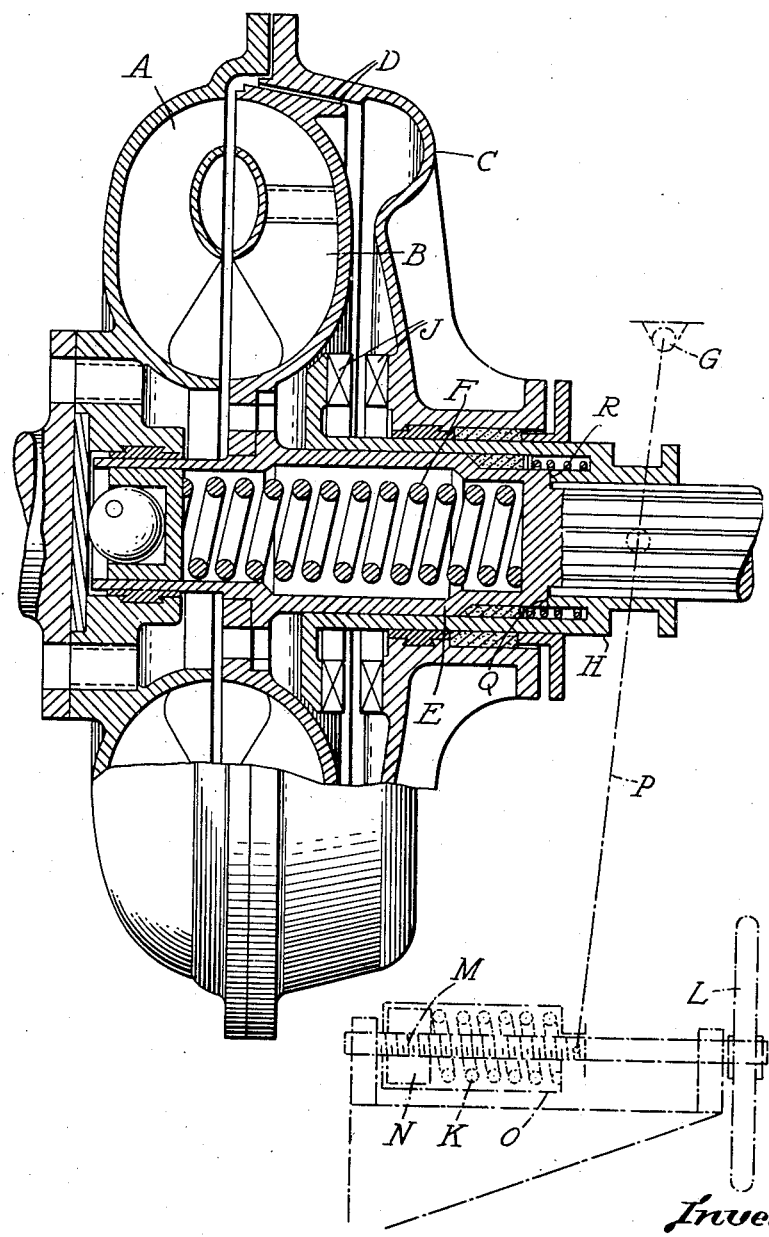

Sept. 20, 1938.　　　　A. NESS　　　　2,130,895
HYDRAULIC COUPLING
Filed Dec. 24, 1937　　　4 Sheets-Sheet 1

Inventor:
ARTUR NESS
By Dean Fairbank & Hirsch
Attorneys.

Sept. 20, 1938.  A. NESS  2,130,895
HYDRAULIC COUPLING
Filed Dec. 24, 1937  4 Sheets-Sheet 3

Inventor:
ARTUR NESS
By Dean Fairbank & Hirsch
Attorneys.

Sept. 20, 1938.   A. NESS   2,130,895
HYDRAULIC COUPLING
Filed Dec. 24, 1937   4 Sheets-Sheet 4

Inventor:
ARTUR NESS
By Dean Fairbank & Hirsch
Attorneys.

Patented Sept. 20, 1938

2,130,895

UNITED STATES PATENT OFFICE 2,130,895

HYDRAULIC COUPLING

Artur Ness, Hamburg, Germany, assignor to Deschimag, Bremen, Germany, a corporation of Germany Application December 24, 1937, Serial No. 181,600½. In Germany December 24, 1936

4 Claims. (Cl. 192—48)

Many constructions are known in which a hydro-kinetic coupling is by-passed by a friction clutch or dog clutch to attain loss-less transmission during normal operation. A construction with a friction clutch only has the disadvantage that slip in this clutch is hardly avoidable during long periods of operation. When designed for full power transmission, the friction clutch becomes too large and in addition the heat developed with considerable slip may have unforeseen results within the operating liquid.

To attain shock- and noise-free engagement of the dog clutch members, a dog clutch requires exactly equal speeds of the parts to be coupled. In the absence of special devices this equality is hardly or not at all attainable with the hydraulic coupling alone.

The object of the invention is a combination of hydraulic slip coupling, friction clutch and dog clutch for use as a so-called starting clutch with relatively high slip (for example 30%) at the operating speed of the driving engine. The power transmitted by the hydraulic coupling in this case during starting only amounts to a small part of the maximum power. Only after by-passing the hydraulic coupling by engaging the dog clutch whereby the slip is reduced to zero, is the power increased to the maximum value. In this way the diameter of the coupling can be made considerably smaller than the usual dimension for say 2 to 3% slip.

The following numerical example will illustrate the advantage of this combined coupling. It will be assumed that with a speed of the driving engine of 200 R. P. M. a power of say 400 H. P. is to be transmitted. A hydraulic coupling alone for this would require an outer diameter of the hydraulic circuit of some 475 mm. A coupling combination according to the invention would be so designed that the hydraulic coupling at 2000 R. P. M. of the driving shaft and a slip of 30%, only needs to transmit say 200 H. P. The outer diameter of the circuit then only amounts to some 325 mm. When the dog clutch has been engaged the combination can transmit the whole power of 400 H. P. without loss.

This coupling combination is of particular use when heavy masses with high moments of inertia are to be started up, for example in rolling mills, punches, presses and similar machines. The further result is obtained with this very soft coupling that critical speeds of shafts in ships, aircraft, etc., during starting up of the driving engines are strongly damped. In railway vehicles with Diesel engine drive, (driving coaches) such a hydraulic coupling designed for large slip ensures a very smooth start. During normal operation with the dog clutch engaged, slip is always entirely eliminated.

The accompanying drawings show an embodiment of the invention in four different positions, in Figures 1 to 4 respectively.

The hydraulic coupling part consists as usual of a driver A, a runner B and a driver cover C.

A friction clutch D is formed between the outer periphery of the runner and the inner periphery of the driver cover. The friction clutch is engaged by a spring F located within the hollow and axially slidable runner shaft E.

The dog clutch comprises dogs J which are provided on the driver cover C and on a sleeve H which is slidably keyed on the runner shaft E so that though it can slide it rotates with the shaft. The sleeve is provided with an internal shoulder R which abuts a shoulder Q on the runner shaft and thus can hold the latter in the stationary position against the action of its spring F.

The friction clutch and dog clutch work in the operating liquid of the hydraulic coupling.

The axial sliding of the sleeve H is effected for example by a controlling mechanism indicated in the drawings, consisting of handwheel L, screw spindle M, attached thereto, nut N, spring K, spring casing O, and lever P pivoted to the casing O and sleeve H and swinging about fixed point G. The axial movements to the right of the runner shaft E and the sleeve H are effected by entirely separate means. In this way the result is obtained that if the sleeve H is moved to the right, engagement of the friction clutch is completely automatically effected by the spring F.

Figure 1 shows the position of friction and dog clutches and of the controlling mechanism when the hydraulic coupling is in use during starting, i. e. is alone in action. The sleeve H has been moved to its extreme left hand limit by means of the described controlling mechanism. The friction and dog clutches are disengaged. The spring F is compressed. The power is transmitted from the runner B directly through the runner shaft E to the load.

Figure 2:
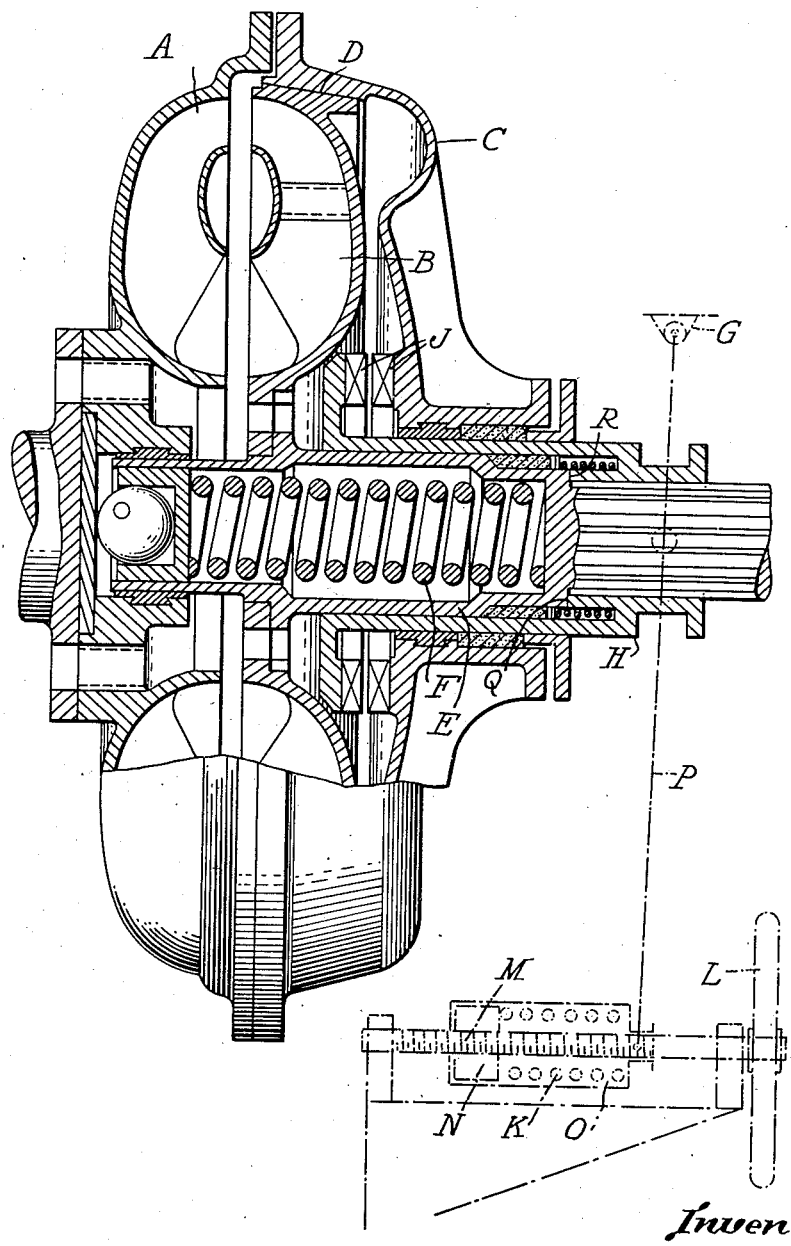
Figure 3:
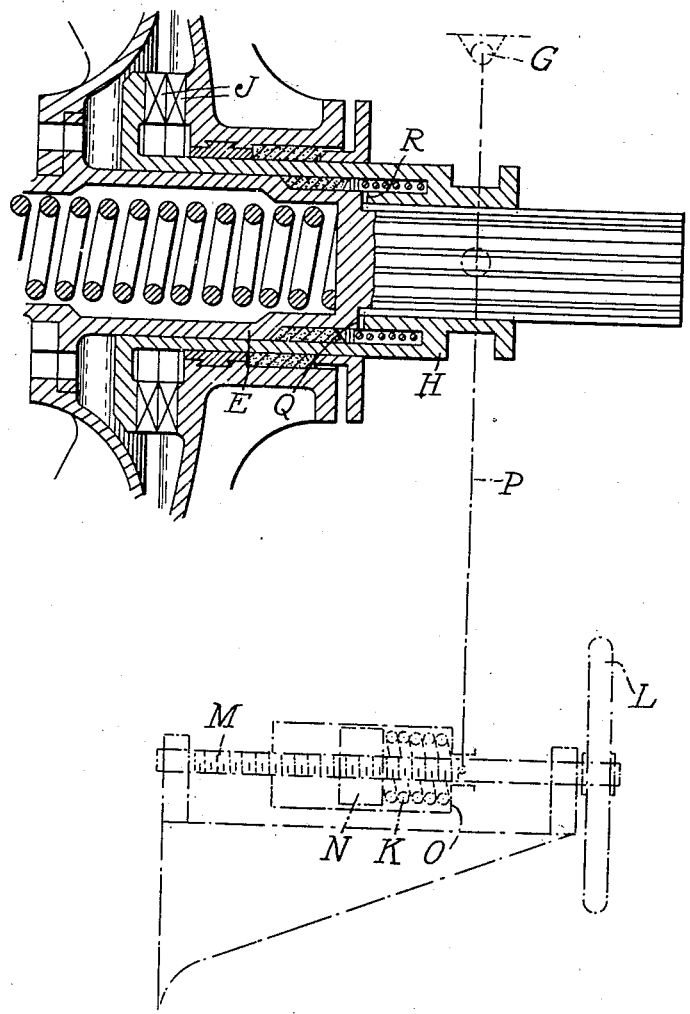

By suitably rotating the handwheel L and thereby the screw spindle M, the nut N and spring casing O are moved to the right and the lever P swung about its fulcrum G. Movement of the sleeve H to the right is thereby initiated. The spring F expands and presses the runner shaft E and runner B slowly to the right and engages the friction clutch D. The spring F is of such strength that the small torque necessary in starting is transmitted by the friction clutch. Synchronism between the driver A and cover C on one hand and the runner B on the other is thereby achieved. By this axial movement the runner B has now reached its extreme right hand position. The power is transmitted from the driver A through the friction clutch D and runner B and directly through the runner shaft E to the load. This position is shown in Figure 2.

Through the separation of the runner shaft E and sleeve H a further sliding of the sleeve H in the same direction is possible. If after engagement of the friction clutch and attainment of synchronism, engagement of the dog clutch upon further movement of the sleeve H is prevented through one set of dogs not being in register with the spaces between the other set, the sleeve H with its dogs J will remain temporarily in the position shown in Figure 3. The handwheel L and screw spindle M can however continue to be rotated until the nut N reaches its end position notwithstanding the holding of the casing O stationary by the lever P. During this rotation the spring K is compressed and its pressure will swing the lever P immediately a slight relative rotation between the parts B and C brings the dogs and spaces into register. The said relative rotation of the coupled parts takes place automatically through slight slipping of the friction clutch caused for example by increase of power, or weakness of the friction clutch.

Figure 4:
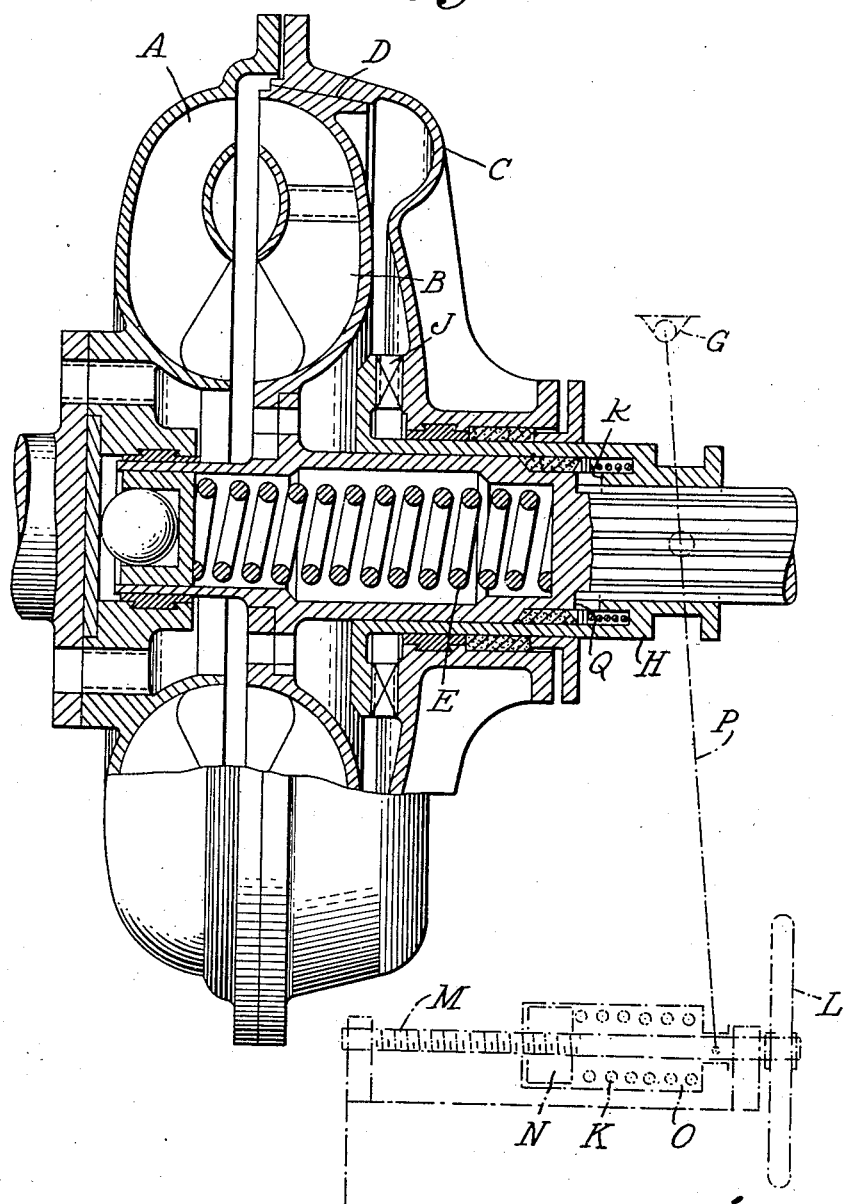

The position of the friction clutch, dog clutch and control mechanism when the dog clutch has been engaged and the hydraulic coupling is by-passed, i. e., out of action, is shown in Figure 4. The power of the driving engine can now be increased and transmitted without loss. The power now passes through the driver A, cover C, dogs J, sleeve H and runner shaft E to the load.

I claim:

1. In a transmission gear the combination of a driver, a slidable runner and driver cover constituting a hydraulic coupling, a friction clutch formed between said runner and said cover, means including an axially slidable sleeve for controlling the sliding of said runner, and a dog clutch formed between said sleeve and said cover, said friction clutch and said dog clutch being located so that when said runner is moved axially under the control of said control means said friction clutch is first engaged and upon further movement of said slidable sleeve said dog clutch is engaged.

2. In a transmission gear the combination of a driver, a runner and a driver cover constituting a hydraulic coupling, a slidable runner shaft carrying said runner, a friction clutch formed between said runner and said cover engageable by axial movement of said runner away from said driver, spring means urging said runner shaft away from said driver, a sleeve slidably keyed on said runner shaft, means enabling said sleeve to check sliding of said runner shaft under the urge of said spring means, means for sliding said sleeve axially to a position beyond which the tendency of said runner shaft to follow it under the urge of said spring means is checked by engagement of said friction clutch and a dog clutch formed between said sleeve and said cover and engaged when said sleeve has reached the said position.

3. A transmission as set forth in claim 1 in which said controlling means includes a spring element which automatically completes the movement of the said sleeve to engage said dog clutch when the set of dogs on one part of said dog clutch is in register with the spaces between the other set.

4. A transmission as set forth in claim 2 in which said means for sliding said sleeve includes a spring element which automatically completes the movement of the said sleeve to engage said dog clutch when the set of dogs on one part of said dog clutch is in register with the spaces between the other set.

ARTUR NESS.